(12) United States Patent
Velmurugan

(10) Patent No.: US 7,348,836 B1
(45) Date of Patent: Mar. 25, 2008

(54) INTEGRATED CIRCUIT CORE POWER SUPPLY EVENT MONITOR

(75) Inventor: Senthil S. Velmurugan, San Jose, CA (US)

(73) Assignee: Nvidia Corporation, Santa Clara, CA (US)

( * ) Notice: Subject to any disclaimer, the term of this patent is extended or adjusted under 35 U.S.C. 154(b) by 0 days.

(21) Appl. No.: 11/204,594

(22) Filed: Aug. 15, 2005

(51) Int. Cl.
*G05F 1/10* (2006.01)
(52) U.S. Cl. .......................................... 327/545; 327/77
(58) Field of Classification Search .................. 327/72, 327/77, 534, 535, 545, 546, 143
See application file for complete search history.

(56) References Cited

U.S. PATENT DOCUMENTS

| | | | | |
|---|---|---|---|---|
| 5,675,272 A | * | 10/1997 | Chu | ............................ 327/142 |
| 6,124,732 A | * | 9/2000 | Zilic et al. | ..................... 326/63 |
| 6,535,424 B2 | * | 3/2003 | Le et al. | ................. 365/185.18 |
| 7,003,421 B1 | * | 2/2006 | Allen et al. | ................... 702/117 |
| 7,005,894 B2 | * | 2/2006 | Weder | .......................... 327/74 |

* cited by examiner

*Primary Examiner*—Jeffrey Zweizig

(57) ABSTRACT

An integrated circuit core power supply event monitor is disclosed. The integrated circuit core power supply event monitor includes a plurality of sub-circuit power supply event monitors. Each sub-circuit power supply event monitor includes a first input for receiving a first voltage, a second input for receiving a second voltage, a comparator for comparing the first voltage to the second voltage in order to detect an occurrence of a voltage deviation of the first voltage from a predetermined magnitude and an output for outputting an indicator of the occurrence of a voltage deviation of the first voltage from a predetermined magnitude if a voltage deviation of the first voltage from a predetermined magnitude occurs. A register for receiving the indicator of the occurrence of the voltage deviation of the first voltage from a predetermined magnitude and for registering the indicator of the occurrence of the voltage deviation from a predetermined magnitude.

20 Claims, 3 Drawing Sheets

INTEGRATED CIRCUIT CORE POWER SUPPLY EVENT MONITOR

TECHNICAL FIELD

Embodiments of the invention pertain to integrated circuit core power supply monitors for integrated circuit devices.

BACKGROUND ART

Integrated circuits are small electronic devices made out of a semiconductor material. Integrated circuits are sometimes called chips or microchips. An integrated circuit may function as an amplifier, oscillator, timer, counter, computer memory, or microprocessor. Moreover, integrated circuits may be categorized as linear, analog or digital depending on the intended application.

Integrated circuit power distribution systems deliver power to the various blocks or sub-circuits of the integrated circuit. It should be appreciated that these individual sub-circuits of the integrated circuit may have rail voltages that are different from the supply voltage of the integrated circuit itself. It is important that the rail voltages of the sub-circuits of the integrated circuit be stable so that the proper operation of the integrated circuit is maintained. Undesirable voltage fluctuations such as over-voltage or under-voltage events (e.g., glitches) can cause a malfunction of the integrated circuit, even if transitory.

Over-voltage and under-voltage events are voltage shifts that deviate from the rail voltage by a certain percentage. When the voltage that is supplied to a sub-circuit of the integrated circuit rises above the rail voltage by a certain percentage it is termed an over-voltage event. When the voltage that is supplied to a sub-circuit falls below the rail voltage by a certain percentage it is termed an under-voltage event. The occurrence of over-voltage and under-voltage events may be indicative of power distribution problems and may be a cause of an integrated circuit malfunctioning.

Ensuring proper power distribution to the individual circuit blocks of an integrated circuit core is problematic for many conventional integrated circuit power distribution networks. Many of these systems do not possess adequate systems for effectively assessing actual power distribution across the integrated circuit. Additionally, many times it is not clear if an integrated circuit is actually malfunctioning due to the various forms of glitches that can occur on the power rail or due to some other problem not related to the power distribution system. The lack of systems that accurately identify areas of an integrated circuit whose malfunctioning is caused by glitches on the power rail is a serious weakness of many conventional systems.

SUMMARY OF THE INVENTION

Accordingly, a need exists for an effective means of monitoring over-voltage and under voltage events occurring within an integrated circuit core. The present invention provides a system that addresses the above-mentioned need.

In one embodiment, power supply event monitors are used to facilitate the assessment of power distribution within an integrated circuit core through the direct monitoring of integrated circuit core over-voltage and under-voltage events. In one embodiment, this is accomplished through a detection of the occurrences of over-voltage and under-voltage events at points near some or all of the sub-circuits (at a voltage rail or rails of sub-circuits) of integrated circuit core. The integrated circuit core level view of such occurrences may provide an indication of whether the power supplied to a particular area of an integrated circuit core is sufficient, deficient or excessive. In this embodiment, the event monitors are circuits that are integrated within the core that they monitor.

In one embodiment, an integrated circuit core power supply event monitor is disclosed that includes a plurality of integrated circuit core sub-circuit power supply event monitors. Each of the integrated circuit core sub-circuit power supply event monitors include a first input for receiving a first voltage, a second input for receiving a second voltage, a comparator for comparing the first voltage to the second voltage (as a means of detecting an occurrence of a voltage deviation of the first voltage from a predetermined magnitude) and an output for outputting an indicator of the occurrence of a voltage deviation of the first voltage of a predetermined magnitude. Each integrated circuit core sub-circuit power supply event monitor also includes a register for receiving and registering (i.e. storing) the indicator of the occurrence of a voltage deviation of the first voltage from a predetermined magnitude.

It is appreciated that an application program, e.g., a debugger and/or a trouble reporter as a system application, may read the registers to determine the status of a registered event. This status may include an identification of the event monitor that detected the event and a timestamp of the event. Corrective action may be automatically taken, or a reporting action may be performed. The registers may be polled for event notification or the reporting may be interrupt driven.

These and other advantages of the present invention will no doubt become obvious to those of ordinary skill in the art after having read the following detailed description of the preferred embodiments which are illustrated in the drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Integrated Circuit Core Power Supply Event Monitor

Figure 1:
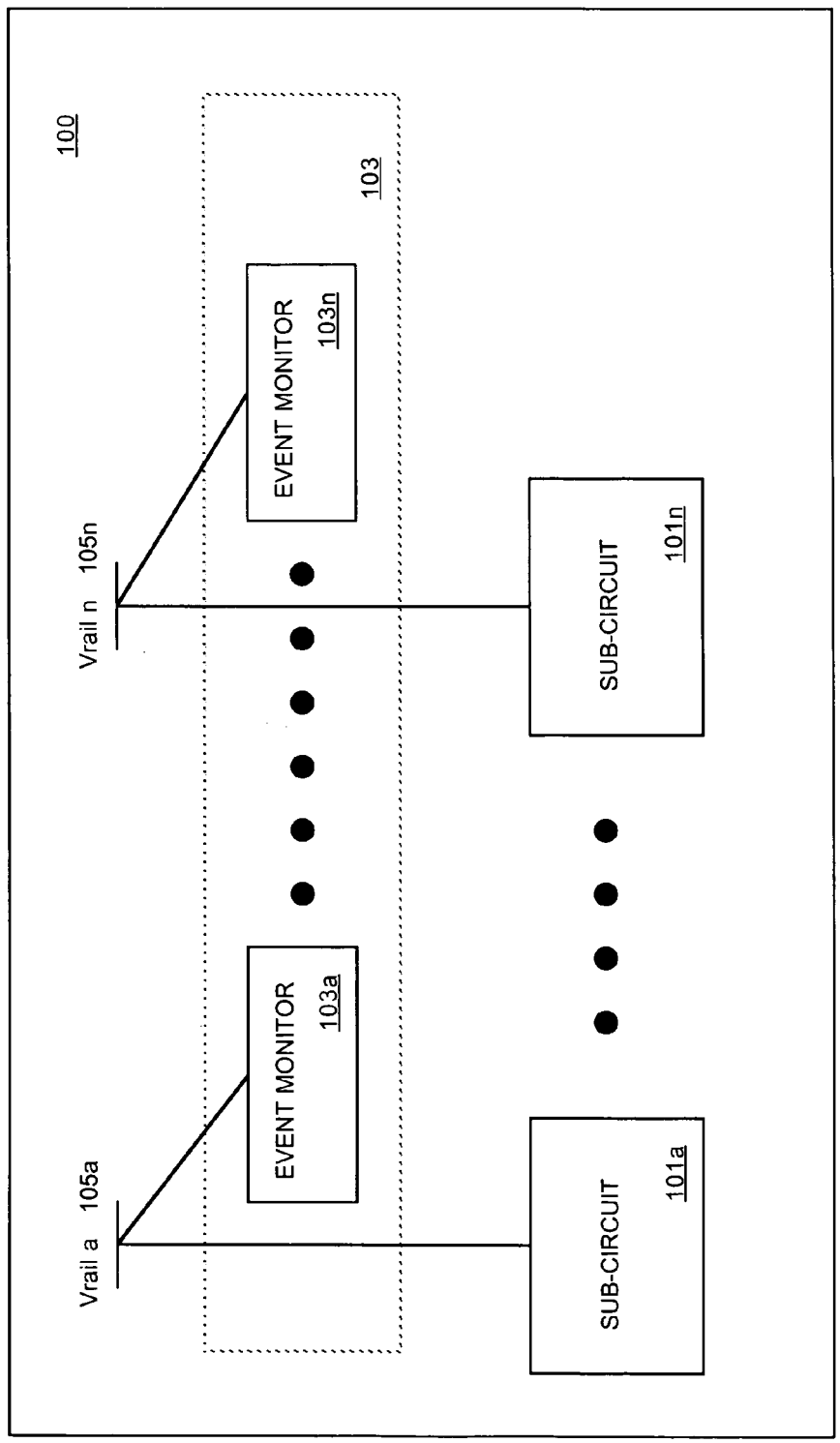
FIG. 1 shows a block diagram of an integrated circuit core that has respective integrated power supply event monitors associated with its respective integrated sub-circuits according to one embodiment of the present invention.

FIG. 1 shows a block diagram of an integrated circuit core 100 that has an integrated circuit core power supply event monitor 103 that includes multiple respective integrated circuit core sub-circuit power supply event monitors 103a-103n associated with respective sub-circuits 101a-101n of integrated circuit core 100 according to one embodiment of the present invention. In one embodiment, integrated circuit core sub-circuit power supply event monitors 103a-103n facilitate the assessment of power distribution within integrated circuit core 100 for troubleshooting and event reporting. In one embodiment this is accomplished through a detection of the occurrences of over-voltage and under-voltage events at points near each of the sub-circuits (e.g., at voltage rail or rails 105a-105n of sub-circuits 101a-101n) of integrated circuit core 100.

It should be appreciated that the provided integrated circuit level view of over-voltage and under-voltage occurrences may provide an indication of whether the power supplied to a particular area of integrated circuit core 100 is sufficient, deficient or excessive. In the FIG. 1 embodiment, integrated circuit core 100 includes integrated circuit sub-circuits 101a-101n and integrated circuit core power supply event monitor 103 that includes integrated circuit sub-circuit power supply event monitors 103a-103n.

Referring to FIG. 1, as discussed above, integrated circuit core 100 includes a plurality of sub-circuits 101a-101n and associated power supply event monitors 103a-103n. In one embodiment, as discussed above, the association of an event monitor (e.g., 103a-103n) with each sub-circuit 101a-101n of integrated circuit core 100 facilitates the assessment of power distribution within integrated circuit 100. In one embodiment, integrated circuit core 100 may be of any type available (e.g., GPU, amplifier, oscillator, timer, counter, computer memory, microprocessor etc.).

Integrated circuit sub-circuits 101a-101n are sub-circuits of integrated circuit core 100 and may perform various operations in support of the function of integrated circuit core 100. As discussed above, in one embodiment, each of the sub-circuits 101a-101n may have an associated event monitor 103a-103n. In one embodiment, over-voltage and over-voltage events (e.g., glitches) that occur on the power rail, e.g., 105a-105n, of the individual integrated circuit sub-circuits 101a-101n may be detected by respective event monitors 103a-103n that monitor the power rail, e.g., 105a-105n, of the individual integrated circuit sub-circuits 101a-101n.

In one embodiment, sub-circuit power supply event monitors 103a-103n monitor the rail voltages that are supplied to sub-circuits 101a-101n of integrated circuit core 100 for occurrences of over-voltage and under-voltage events (e.g., glitches). In an alternate embodiment, other voltage nodes near sub-circuits 101a-101n may be monitored instead or in addition. In one embodiment, the rail voltages 105a-105n that supply sub-circuits 101a-101n are used to generate local references (see discussion made with reference to FIG. 2 below) that are compared to the rail voltages 105a-105n as a means of detecting over-voltage or under-voltage events (e.g., glitches).

In alternate embodiments, voltages from other nodes near sub-circuits 101a-101n may be used to generate local references. In one embodiment, when the rail voltage 105a-105n (or other voltage) that is supplied to a sub-circuit 101a-101n deviates in magnitude from the locally generated reference, an over-voltage or under-voltage event (e.g., glitches) is considered to have occurred.

In one embodiment, when sub-circuit power supply event monitors 103a-103n associated with sub-circuits 101a-101n detect over-voltage or under-voltage events (e.g., glitches), an indicator of the occurrence of the event may be stored in a register associated with each sub-circuit (see discussion made with reference to FIG. 2 below) that records the occurrences of over-voltage and under-voltage events for the particular sub-circuit (e.g., 101a-101n) with which it is associated. These registers may be polled by appropriate applications for event reporting or debugging.

In this manner, a record of the occurrences of over-voltage and under-voltage events for the entire integrated circuit core 100 may be maintained. In one embodiment, a comparator (see discussion made with reference to FIG. 3 below) may be employed to output signal indicators of the occurrences of over-voltage or under-voltage events that may be received by a register (see FIG. 2) that stores the indicators of the occurrences of over-voltage and under-voltage events (e.g., glitches) for each sub-circuit.

In other embodiments, other suitable means of storing indicators of (e.g., recording) over-voltage and under-voltage occurrences may be employed. It should be appreciated that storing indicators of occurrences of over-voltage and under-voltage events may be used as a means of assessing power distribution within integrated circuit core 100.

In one embodiment, sub-circuit power supply event monitors 103a-103n may be situated inside integrated circuit core 100 (e.g., inside the main VLSI chip) at one or multiple areas of an integrated circuit die (e.g., GPU input/output sections and FPU or at all sub-circuits of integrated circuit core 100 as shown in FIG. 1). Consequently, circuit malfunctioning in integrated circuit core 100 due to various forms of glitch on the power rail (e.g., 105a-105n) of integrated circuit core 100 may be effectively addressed as the location of the problem areas may be accurately identified.

Figure 2:
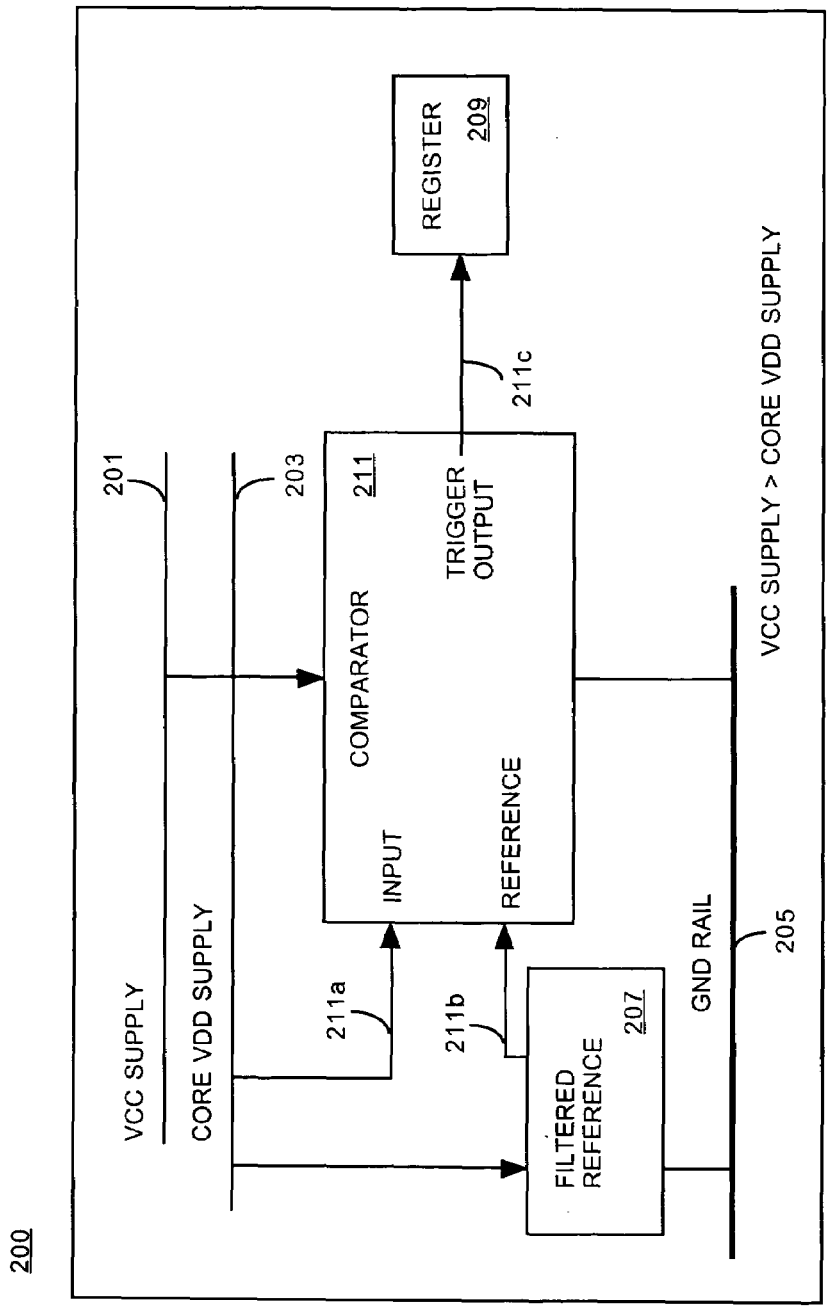
FIG. 2 shows a circuit diagram of a sub-circuit power supply event monitor according to one embodiment of the present embodiment.

FIG. 2 shows a circuit diagram of a sub-circuit power supply event monitor 200 according to one embodiment of the present invention. In the FIG. 2 embodiment, sub-circuit power supply event monitor 200 monitors a supply voltage that is supplied to at least one sub-circuit of an integrated circuit core for occurrences of over voltage and under voltage events (e.g., glitches). In one embodiment, the supply voltage may be used to generate a locally generated filtered reference voltage (e.g., the average value of the supply voltage) that is compared to the supply voltage for over voltage and under voltage detecting purposes. It should be appreciated that when the magnitude of the supply voltage deviates from a magnitude that is equal to that of the locally generated filtered reference voltage an over voltage or under voltage event is considered to have occurred.

In the FIG. 2 embodiment, sub-circuit power supply event monitor 200 includes VCC supply 201, core VDD supply 203, ground rail 205, filtered reference 207, register 209 and comparator 211 that includes rail voltage input 211a, filtered reference input 211b, and output 211c.

Referring to FIG. 2, VCC supply 201 supplies power to comparator 211. Input 211a is coupled to integrated circuit core VDD supply 203 which may be the actual rail voltage that is supplied to the sub-circuit of the integrated circuit associated with event monitor 200. Moreover, input 211b is coupled to a filtered reference voltage 207 that is locally generated. In one embodiment, filtered reference voltage 207 is the average value of integrated circuit core VDD supply 203. In situations where VDD supply 201 changes over time, filtered reference voltage 207 may correspondingly change.

Filtered reference 207 is compared to integrated circuit core VDD supply 203 (e.g., the integrated circuit core rail voltage) by comparator 211. In one embodiment, a filtered reference (e.g., 207) for each sub-circuit (e.g., 101a-101n in FIG. 1) of an integrated circuit core (e.g., 100 in FIG. 1) may be generated from the actual rail voltage 203 that supplies power to the individual sub-circuits (e.g., 101a-101n in FIG. 1) of the integrated circuit. In one embodiment, filtered reference 207 is the average value of this rail voltage (e.g., core VDD supply 203). It should be appreciated that because over-voltage events are very high frequency in nature the filtered reference 207 may have such events averaged out (e.g., such as by capacitive means).

Comparator 211 compares integrated circuit core VDD supply 203 (e.g., rail voltage) to filtered reference 207 to detect occurrences of over-voltage and under-voltage events. In the FIG. 2 embodiment, integrated circuit core VDD supply 203 is the rail voltage that is supplied to the sub-circuit of the integrated circuit core (not shown) that is associated with event monitor 200. And, as previously mentioned filtered reference 207 is a locally generated reference (e.g., average value of the rail voltage).

In one embodiment when the rail voltage that is supplied to the sub-circuit deviates from the locally generated filtered reference 207 an over-voltage or an under-voltage event is considered to have occurred (e.g., is detected). In one embodiment, when an over-voltage or an under-voltage event is detected, comparator 211 outputs via output 211c a signal indicator of the occurrence of the over-voltage or under-voltage event.

Figure 3:
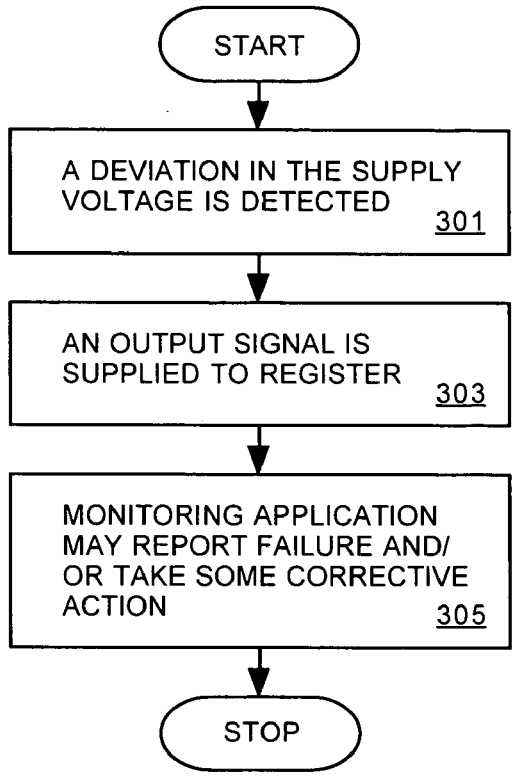
FIG. 3 shows a flowchart of the steps in a method for monitoring integrated circuit power supply events according to one embodiment of the present invention

Register 209 (e.g., counter, latch etc.) registers (e.g., stores) indicators of occurrences of over-voltage and under-voltage events that occur at the supply rail of an associated integrated circuit core sub-circuit. In one embodiment, comparator 211 outputs indicators of occurrences of over-voltage or under-voltage events that are supplied to register 209 upon the occurrence of the over-voltage or under-voltage events. By detecting occurrences of over-voltage and under-voltage events across an integrated circuit core (e.g., 100 in FIG. 1) and registering the indicators of such, power distribution within the integrated circuit core (e.g., 100 in FIG. 1) can be effectively assessed. Also shown in FIG. 3 is ground rail 205.

Operation

In operation, when an over-voltage or an under-voltage event occurs on the supply rail, e.g., VDD supply 203, the actual voltage involved in the over-voltage or under-voltage event is placed on input terminal 211a of comparator 211. This voltage is compared to a filtered reference voltage 207 that is placed on the other input terminal 211b of comparator 211. If the over-voltage or under-voltage event presents a voltage that deviates from the filtered reference voltage 207, comparator 211 outputs a signal from output terminal 211c. The signal that is output is registered by event register 209. In one embodiment, each occurrence of an over-voltage or under-voltage event for each sub-circuit in the integrated circuit is registered in this manner. In one embodiment, the data generated from this supply monitoring process facilitates an accurate assessment of the distribution of power in the integrated circuit core (e.g., 100 in FIG. 1) and helps to accurately identify problem areas of the integrated circuit core (e.g., 100 in FIG. 1).

EXEMPLARY OPERATIONS IN ACCORDANCE WITH EMBODIMENTS OF THE PRESENT INVENTION

FIG. 3 is a flowchart 300 of steps performed in a method for monitoring circuit events according to one embodiment of the present invention. Although specific steps are disclosed in the flowchart, such steps are exemplary. That is, the present invention is well suited to performing various other steps or variations of the steps recited in FIG. 4.

At step 301, a deviation in the integrated circuit core supply rail of a sub-circuit of an integrated circuit core is detected. In one embodiment, a comparator (e.g., 211 in FIG. 2) can be used to detect deviations in the integrated circuit core supply rail. In one embodiment, the integrated circuit core supply rail is compared to a filtered reference voltage. In one embodiment, the filtered reference voltage (e.g., 207 in FIG. 2) for each sub-circuit of the integrated circuit core may be generated from the actual integrated circuit core supply rail voltage that supplies the individual sub-circuits. In one embodiment, the filtered reference voltage is the average values of this rail voltage (e.g., core VDD supply in FIG. 2).

At step 303, an output signal is supplied to an event register (e.g., 209 in FIG. 2). In one embodiment, the event register may be implemented with a counter or a latch. In other embodiments, other suitable implementations may be employed. In one embodiment, event registers (e.g., 209 in FIG. 2) store indicators of the occurrences of over-voltage and under-voltage events across the entire integrated circuit core. In one embodiment, comparators (e.g., 211 in FIG. 2) may be used to output signals to event registers (e.g., 209 in FIG. 2) that the event registers receive upon the occurrence of an over-voltage or an under-voltage event. In this manner the occurrences of over-voltage and under-voltage events can be monitored as a means of assessing power distribution within the chip.

At step 305, a monitoring application may report failure and/or take some corrective action. It is appreciated that an application program, e.g., a debugger and/or a trouble reporter as a system application may read the registers to determine the status of a registered event. This status may include but is not limited to an identification of the event monitor that detected the event and a timestamp of the event. Corrective action may be automatically taken, or a mere reporting behavior may be performed. The event registers may be polled for event notification or the reporting may be interrupt driven.

An integrated circuit core power supply event monitor is disclosed. The integrated circuit power supply event monitor includes a plurality of sub-circuit power supply event monitors. Each sub-circuit power supply event monitor includes a first input for receiving a first voltage, a second input for receiving a second voltage, a comparator for comparing the first voltage to the second voltage in order to detect an occurrence of a voltage deviation of the first voltage and an output for outputting an indicator of the occurrence of a voltage deviation of the first voltage if a voltage deviation of the first voltage occurs. A register for receiving the indicator of the occurrence of the voltage deviation of the first voltage and for registering the occurrence of the voltage deviation.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. An integrated circuit core power supply event monitor, comprising:
    a first input for receiving a first voltage;
    a second input for receiving a second voltage;
    a comparator for comparing said first voltage to said second voltage to detect an occurrence of a voltage deviation of said first voltage from a predetermined magnitude and for outputting an indicator of said occurrence; and
    an event register for storing said indicator of said occurrence of said voltage deviation wherein said voltage deviation is an over-voltage or an under-voltage event and wherein contents of said register are readable upon software request.

2. The integrated circuit core power supply event monitor of claim 1 wherein contents of said register are accessible by an on-chip self-monitoring state machine.

3. The integrated circuit core power supply event monitor of claim 1 wherein said register is a latch or a counter.

4. The integrated circuit core power supply event monitor of claim 1 wherein said first voltage is an integrated circuit core power-supply voltage.

5. The integrated core power supply event monitor of claim 4 wherein said second voltage is a filtered reference voltage.

6. An integrated circuit device, comprising:
    an integrated circuit that comprises a plurality of sub-circuits; and
    a plurality of power supply monitors integrated with each of said plurality sub-circuits, each power supply monitor comprising:
        a first input for receiving a first voltage;
        a second input for receiving a second voltage;
        a comparator for comparing said first voltage to said second voltage to detect an occurrence of a voltage deviation of said first voltage from a predetermined magnitude;
        wherein said comparator includes an output for outputting an indicator of said occurrence; and
    a register for registering said indicator of said occurrence of said voltage deviation wherein said voltage deviation is an over-voltage or an under-voltage even and wherein contents of said register are readable upon software request.

7. The integrated circuit device of claim 6 wherein contents of said register are accessible by an on-chip self-monitoring state machine.

8. The integrated circuit device of claim 6 wherein said register is a latch or a counter.

9. The integrated circuit device of claim 6 wherein said first voltage is a core power-supply voltage.

10. The integrated circuit device of claim 6 wherein said second voltage is a filtered reference voltage.

11. In an integrated circuit comprising a plurality of sub-circuits, a plurality of power supply monitors respectively associated with said plurality of sub-circuits, each of said plurality of power supply monitors comprising:
    means for accessing a first voltage;
    means for accessing a second voltage;
    means for comparing said first voltage to said second voltage to detect an occurrence of a voltage deviation of said first voltage from a predetermined magnitude;
    means for outputting an indicator of said occurrence of said voltage deviation if said voltage deviation occurs; and
    means for receiving said indicator of said occurrence of said voltage deviation and registering said indicator of said occurrence of said voltage deviation wherein said voltage deviation is an over-voltage or an under-voltage event and wherein contents of said register are readable upon software request.

12. The integrated circuit of claim 11 wherein contents of said means for accessing said indicator are accessible by an on-chip self-monitoring state machine.

13. The integrated circuit of claim 12 wherein said means for comparing is a comparator.

14. The integrated circuit of claim 12 wherein said means for accessing said indicator is a latch or a counter.

15. The integrated circuit of claim 12 wherein said first voltage is a core power-supply voltage.

16. The integrated circuit of claim 15 wherein said second voltage is a filtered reference voltage.

17. A method comprising:
    monitoring a power rail voltage within an integrated circuit device;
    generating an indication if said power rail voltage exceeds a reference voltage by a predetermined threshold;
    storing said indication within a register integrated within said integrated circuit device;
    accessing said register to determine if said power rail voltage exceeded said reference voltage by said predetermined threshold; and
    performing an action in response thereto, wherein said accessing and said performing are performed by a software program.

18. A method as described in claim 17 wherein said monitoring and said generating are performed by a monitor circuit integrated within said integrated circuit device.

19. A method as described in claim 17 wherein said power rail voltage is a power rail voltage of a sub-circuit of said integrated circuit device.

20. A method as described in claim 18 wherein said reference voltage is locally generated.

* * * * *